US012668992B2

(12) United States Patent
Hine

(10) Patent No.: US 12,668,992 B2
(45) Date of Patent: Jun. 30, 2026

(54) DOORKNOB WITH PROTECTIVE PORTION

(71) Applicant: Eric Hine, Cincinnati, OH (US)

(72) Inventor: Eric Hine, Cincinnati, OH (US)

( * ) Notice: Subject to any disclaimer, the term of this patent is extended or adjusted under 35 U.S.C. 154(b) by 0 days.

(21) Appl. No.: 18/976,244

(22) Filed: Dec. 10, 2024

(65) Prior Publication Data

US 2025/0327331 A1 Oct. 23, 2025

Related U.S. Application Data

(60) Provisional application No. 63/637,290, filed on Apr. 22, 2024.

(51) Int. Cl.
*E05B 1/00* (2006.01)

(52) U.S. Cl.
CPC .................................. *E05B 1/0061* (2013.01)

(58) Field of Classification Search
CPC ........ E05B 77/04; E05B 85/26; E05B 15/101; E05B 17/0025; E05B 77/40; E05B 85/243; E05B 85/00; E05B 79/04; E05B 85/04
See application file for complete search history.

(56) References Cited

U.S. PATENT DOCUMENTS

D21,139 S 10/1891 Hess
1,668,716 A 5/1928 Herdman et al.
1,683,205 A 9/1928 Packard
1,830,383 A 11/1931 Bos
2,115,654 A 4/1938 Swofford
2,247,592 A 7/1941 Swift
2,570,954 A 10/1951 Kasman
2,660,751 A 12/1953 Falkenberg
2,661,610 A 12/1953 Alfred
(Continued)

FOREIGN PATENT DOCUMENTS

FR 2835864 8/2003

OTHER PUBLICATIONS

Product page from Amazon entitled "Door Knob Safety Cover for Kids (4 Pack) New Shape & Structure Design Child Door Knob Covers Prevent Children from Opening Doors Baby Safety Door Knob Locks Fit Most Knobs", retrieved Dec. 7, 2024. Retrieved from Internet: <https://www.amazon.com/Safety-Structure-Prevent-Children-Opening/dp/B084NZLX89/ref=asc_df_B084NZLX89/?tag-hyprod-20&linkCode=df0&hvadid=459775342043&hvpos=&hvnetw=g&hvrand=9379124867272641 84&hvpone=&hvptwo=&hvqmt=&hvdev=c&hvdvcmdl=&hvlocint=&hvlocphy=9028257&hvtargid=pla-943706513759&psc=1>.
(Continued)

*Primary Examiner* — Kristina R Fulton
*Assistant Examiner* — Thomas L Neubauer

(57) ABSTRACT

Embodiments of the present invention comprise a doorknob with a knob portion and a protective portion. A plurality of knob extrusions may extend outwards from a knob outer surface. A plurality of protective portion indentations may extend from a protective portion inner surface towards a protective portion outer surface. The protective portion may be removably or permanently configured over the knob portion whereby the plurality of knob extrusions are configured within the plurality of protective portion indentations to secure the protective portion to the knob portion. The knob extrusions may extend a distance parallel to a knob center axis. Said distance may be less than a corresponding knob length. The knob extrusions may be configured within the protective portion indentations whereby the protective portion is secured to the knob both tangentially and axially.

16 Claims, 6 Drawing Sheets

(56) References Cited

U.S. PATENT DOCUMENTS

| | | | | | |
|---|---|---|---|---|---|
| 2,699,809 | A | | 1/1955 | Kenneth et al. | |
| 2,721,597 | A | | 10/1955 | Frank | |
| 2,731,056 | A | | 1/1956 | Anson | |
| 3,249,990 | A | | 5/1966 | Schlage | |
| 3,306,643 | A | * | 2/1967 | Reed | E05B 13/001 16/DIG. 30 |
| 3,578,051 | A | | 5/1971 | Hammon | |
| 4,181,339 | A | | 1/1980 | Rigsby | |
| D262,773 | S | | 1/1982 | Wansbrough et al. | |
| 4,856,140 | A | | 8/1989 | Visco et al. | |
| D329,590 | S | | 9/1992 | Chapman | |
| 5,231,733 | A | | 8/1993 | Dittman | |
| 5,495,641 | A | * | 3/1996 | Going | E05B 1/0061 16/414 |
| 5,615,567 | A | * | 4/1997 | Kemp | E05B 17/002 70/423 |
| 5,701,635 | A | * | 12/1997 | Hawkes | E05C 17/52 16/86 A |
| 5,840,122 | A | * | 11/1998 | Williams | E05B 1/0061 118/505 |
| 5,933,915 | A | * | 8/1999 | El Dessouky | E05F 5/06 16/86 A |
| D435,210 | S | | 12/2000 | Hussaini | |
| 6,154,928 | A | * | 12/2000 | Thom | E05B 1/0053 16/DIG. 30 |
| 6,834,414 | B2 | | 12/2004 | Chiu | |
| D712,716 | S | | 9/2014 | Taylor | |
| 9,051,757 | B2 | * | 6/2015 | Bracey | E05B 1/0069 |
| 10,150,444 | B1 | | 12/2018 | Schwalm et al. | |
| 10,422,157 | B1 | * | 9/2019 | Lindstead | E05B 1/0053 |
| D917,261 | S | * | 4/2021 | Kho | E05B 13/001 D8/322 |
| 2006/0209550 | A1 | | 9/2006 | Fabiao | |
| 2006/0230576 | A1 | | 10/2006 | Meine | |
| 2008/0307604 | A1 | | 12/2008 | Leung | |
| 2014/0260451 | A1 | * | 9/2014 | Quach | E05B 47/0012 70/278.1 |

OTHER PUBLICATIONS

Product page from Life Saving Products entitled “Door Knob Wall Protector Cup-Type”, retrieved Dec. 7, 2024. Retrieved from Internet: <https://lcpshop.net/product/door-knob-wall-protector-cup-type/?gad=1&gclid=Cj0KCQjw7uSkBhDGARIsAMCZNJvmDXUTU9SZUvn211ZOe1UbM9S6efWgGYCqZKTHm6RNNLSdc2wPMfcaAhvyEALw_wcB>.

Product page from Amazon entitled IMPRESA Two Pack Door Handle Extension, Soft Rubberized Doorknob Extension, Converts Knob Style Doors to Handles for Easy Accessibility for Elderly, Disabled, Children, Fits Door Knobs 2" to 2.5", retrieved Dec. 7, 2024. Retrieved from Internet: <https://www.amazon.com/Extension-Rubberized-Doorknob-Converts-Accessibility/dp/B08914P541/ref=asc_df_B08914P541/?tag-hyprod-20&linkCode=df0&hvadid=507593807983&hvpos=&hvnetw=g&hvrand=13150311491108711281&hvpone=&hvptwo=&hvqmt=&hvdev=c&hvdvcmdl=&hvlocint=&hvlocphy=9028257&hvtargid=pla-1027181157571&psc=1>.

Product page from Ali Express entitled “Hot Sale Door Knob Covers Soft Foam Door Handle Knob Cover Protector Static-free Baby Safety Protective Elastic Home Supplies”, retrieved Dec. 7, 2024. Retrieved from Internet: <https://www.aliexpress.us/item/3256802397696197.html?gatewayAdapt=glo2usa4itemAdapt>.

Product page from Amazon entitled “The Door Knob Wonder Cover”, retrieved Dec. 7, 2024. Retrieved from Internet: <https://www.amazon.com/The-Door-Knob-Wonder-Cover/dp/B073ZJW4VJ/ref=asc_df_B073ZJW4VJ/?tag=&linkCode=df0&hvadid=343242903788&hvpos=&hvnetw=g&hvrand=9862200511271390825&hvpone=&hvptwo=&hvqmt=&hvdev=c&hvdvcmdl=&hvlocint=&hvlocphy=9028257&hvtargid=pla-786993444204&mcid=8914dable6903f4587b216a1569b9ab4&ref=&adgrpid=70737353002&gclid=Cj0KCQjwk6SwBhDPARIsAJ59GwcWpy7K0p_M3GS9wkOJ7rI2vBBKTLVJy2gaFVa1IqfSpu2vsvRidgaAlQjEALw_wcB&th=1>.

* cited by examiner

DOORKNOB WITH PROTECTIVE PORTION

CROSS-REFERENCE TO RELATED APPLICATIONS

This application claims priority to U.S. Provisional Patent Application No. 63/637,290, filed on Apr. 22, 2024, which is hereby incorporated by reference.

BACKGROUND OF THE INVENTION

The present invention relates to doorknobs. In many buildings internal doors are configured near corners of walls, wherein when the door is opened, the knob of the door (i.e. the doorknob) contacts the wall. This may cause damage to the wall and/or doorknob. Devices such as door stops exist that act as barriers between doors and walls or between doorknobs and walls. Such devices are generally configured on a door, on a wall, or over the doorknob. Doorstops configured over doorknobs generally rotate relative to the doorknob and therefore pose the risk of becoming detached from the doorknob.

SUMMARY OF THE INVENTION

Embodiments of the present invention may comprise a doorknob, which is a device attached a door that, when rotated, activates a latch to secure the door closed or to unsecure the door whereby the door may be opened. Doorknobs differ from door handles in that door handles have a free end and a connected end separated by a handle length, whereby the handle length is configured parallel to a width of the door. Doorknobs also have a free end and a connected end, however, the free end and connected end of a doorknob are separated by a knob length that is configured perpendicular to the width of the door. The handle length of a door handle is generally longer than the knob length of a doorknob. Furthermore, door handles are generally actuated by pressing on the handle in a linear motion to rotate the handle. Doorknobs are generally actuated by grasping the doorknob and performing a rotary twisting motion to rotate the doorknob. While both door handles and doorknobs have an axis of rotation, the axis of rotation of a doorknob is generally the same as its center axis, whereby the axis of rotation of a door handle is generally configured perpendicular to its center axis.

The doorknob of the present invention may comprise a doorknob with a knob portion and a protective portion configured over the knob portion. The knob portion may have a knob outer surface that surrounds a knob center axis. The knob outer surface may be cylindrical or generally cylindrical. "Generally cylindrical" as used herein means a rounded, continuous side that connects two opposing faces. The rounded continuous side need not have a single radius of curvature to be "generally cylindrical". The two opposing faces need not be perfectly parallel for the rounded, continuous side to be "generally cylindrical".

The two opposing faces connected by the knob outer surface may be a knob front face and a knob rear face. A knob rear connector may extend from the knob rear face away from the knob front face. The knob rear connector may be configured to connect the doorknob to a door or to another doorknob such that the doorknob of the present invention may be rotated about the knob center axis. A lock actuator may extend from the knob front face away from the knob rear face. Alternatively, the lock actuator may extend into the knob front face towards the knob rear face. The lock actuator may be pressed, pulled, or twisted to activate a lock mechanism that may prevent the doorknob from being rotated about the knob center axis.

A knob length may extend from the knob rear connector to the knob front face. Alternatively, the knob length may extend from the knob rear face to the knob front face. Alternatively, the knob length may extend from the knob rear connector to the lock actuator. Alternatively, the knob length may extend from the knob rear face to the lock actuator. The knob portion may have a knob diameter that is measured from two opposing points on the knob outer surface.

A plurality of knob extrusions may extend a knob extrusion distance outwards from the knob outer surface. The knob extrusion distance may be twice the knob diameter or less, one times the knob diameter or less, half the knob diameter or less, or any distance between and including the values provided. The plurality of knob extrusions may also extend axially along the knob outer surface. The plurality of knob extrusions may extend the entire knob length axially along the outer surface. Alternatively, the plurality of knob extrusions may only extend a portion of the knob length axially across the knob outer surface.

The protective portion may have a protective portion inner surface and a protective portion outer surface. Both the protective portion inner surface and the protective portion outer surface may be cylindrical or generally cylindrical. The protective portion may have a protective portion front face and a protective portion rear face that are connected by the protective portion outer surface and the protective portion inner surface. A plurality of protective portion indentations may extend a protective portion indentation distance from the protective portion inner surface towards the protective portion outer surface. The protective portion indentation distance may be substantially the same as the knob extrusion distance. "Substantially" the same as used herein means "within 5% of". When the protective portion is configured over the knob portion, each of the plurality of knob extrusions may be configured within one of the plurality of protective portion indentations. This may secure the protective portion tangentially to the knob portion. This is useful since when the doorknob is used, the doorknob is twisted about the knob center axis. If the protective portion were not secured tangentially to the knob portion, the protective portion would rotate relative to the knob portion when a user grasps the doorknob and twists, and therefore doorknob may not rotate when twisted. Since the protective portion is secured tangentially to the knob portion, the protective portion and knob portion rotate together about the knob center axis when the doorknob is twisted.

Each knob extrusion may have two axial sides and two extrusion inward cuts. The two extrusion inwards cuts may be configured at a non-parallel angle relative to each other. Each protective portion indentation may have two axial sides and two indentation outward cuts. The two indentations inward cuts may be configured at a non-parallel angle relative to each other. When the plurality of knob extrusions are configured within the plurality of protective portion indentations, each of the indentation outward cuts may be configured within a corresponding extrusion inward cut. This configuration may further serve to secure the protective portion tangentially to the knob portion. When the plurality of knob extrusions are configured within the plurality of protective portion indentations, the axial sides of each of the plurality of knob extrusions may be configured between the axial sides of a corresponding protective portion indentation. This may serve to secure the protective portion axially to the knob portion. In this configuration, the axial sides of the plurality of knob extrusions and the axial sides of the plurality of protective portion indentations may be configured parallel to one another.

When the protective portion is configured over the knob portion, the protective portion front face may be configured parallel to the knob front face and the protective portion rear face may be configured parallel to the knob rear face. The knob front face and the knob rear face may be configured between the protective portion front face and the protective portion rear face such that protective portion is secured axially to the knob portion by contact between the protective portion front face and the knob front face and by contact between the protective portion rear face and the knob rear face. At least a portion of the knob front face, including the lock actuator, may be accessible through the protective portion front face. This is important since the lock actuator may be a critical component for using the doorknob, and therefore accessing the lock actuator through the protective portion front face is an essential function of the doorknob. When the protective portion is configured over the knob portion, at least a portion of the knob rear face, including the knob rear connector, may be accessible through the knob rear face. This is important because it allows the protective portion to be configured over the knob portion. If the protective portion rear face were solid (i.e. without openings), the protective portion could not be configured over the knob portion. Furthermore, if the knob rear connector was not accessible through the protective portion rear face, the doorknob would not be able to connect to a door or another doorknob, and therefore would not be able to serve its function as a doorknob.

When the protective portion is configured over the knob portion, the protective portion front face may extend past the knob front face away from the knob rear connector. In this configuration, the protective portion may serve as a barrier between the knob portion and another object. This may prevent damage to the knob portion or to the other object when the doorknob contacts the other object. The protective portion may be made of a flexible material, meaning that the protective portion may be made of a material with a Young's modulus in the range of 0.1 MPa to 10 MPa, inclusive of said values. The protective portion may be made of a material such as but not limited to natural rubber, silicone, or nitrile. The flexible material of the protective portion may allow the protective portion to absorb the force of contacting another object, and thereby serve as an effective barrier between the knob portion and the other object. The knob portion may be made of a material that is more rigid than the material of the protective portion. The knob portion may be made of a material such as but not limited to steel, aluminum, brass, or high-density polyethylene. The relatively rigid material of the knob portion allows the knob portion to retain its shape so that the doorknob can be grasped, rotated, and connected to a door or to another doorknob.

The protective portion may be removably connected to the knob portion by stretching the protective portion whereby the protective portion is slid over the knob portion from the knob front face towards the knob rear face. The protective portion may be stretched to fit each of the plurality of protective portion indentations over a corresponding one of the knob extrusions. The protective portion may then be allowed to retract such that the protective portion fits tightly to the knob portion. The protective portion may then be removed from the knob portion may stretching the protective portion and pulling the protective portion off the knob portion from the knob rear face towards the knob front face. The stretching of the protective portion may be made possible by the flexible material of the protective portion.

Alternatively, the protective portion may be permanently connected to the knob portion. In these embodiments, an adhesive may be used to bond the knob outer surface to the protective portion inner surface, and to bond the plurality of knob extrusions to the plurality of protective portion indentations. Alternatively, in embodiments wherein the protective portion is permanently configured over the knob portion, the protective portion inner surface may comprise malleable extensions that may be swaged over a portion of the knob front face and/or a portion of the knob rear face. The malleable extensions may be made of metal such as but not limited to steel, aluminum, or brass.

The protective portion outer surface may be smooth and free of extrusions and indentations. In such embodiments, the protective portion outer surface may have a surface roughness of 5 microns or less. A smooth outer surface may have an aesthetic appeal and may be easier to clean than a rougher surface.

In alternative embodiments, outer surface indentations may extend from the protective portion outer surface towards the protective portion inner surface. The outer surface indentations may act like treads on a tire and may allow a user to easily grip the protective portion when the user twists the doorknob to rotate the doorknob about the knob center axis.

A knob rear stop may be configured between the knob front face and the knob rear face. The knob rear stop may extend outwards from the knob rear surface. The knob rear stop may extend outwards a distance greater than the knob extrusion distance. The plurality of knob extrusions may not extend axially along the knob rear stop. Therefore, the plurality of knob extrusions may only extend from the knob front face to the knob rear stop. When the protective portion is configured over the knob portion, the protective portion may not be configured over the knob rear stop.

A plurality of knob indentations may extend from the knob outer surface towards the knob center axis. The plurality of knob indentations may also extend from the plurality knob extrusions towards the knob center axis. A plurality of protective portion extrusions may protrude from the protective portion inner surface away from the protective portion outer surface. The plurality of protective portion extrusions may also protrude from the plurality of protective portion indentations away from the protective portion outer surface. When the protective portion is configured over the knob portion, each of the plurality of protective portion extrusions may be configured within a corresponding one of the plurality of knob indentations. This may serve to secure the protective portion axially to the knob portion. This is especially useful in embodiments wherein the knob portion comprises the knob rear stop since in said embodiments the protective portion rear face cannot be configured over the knob rear face to secure the protective portion axially to the knob portion.

Figure 5:
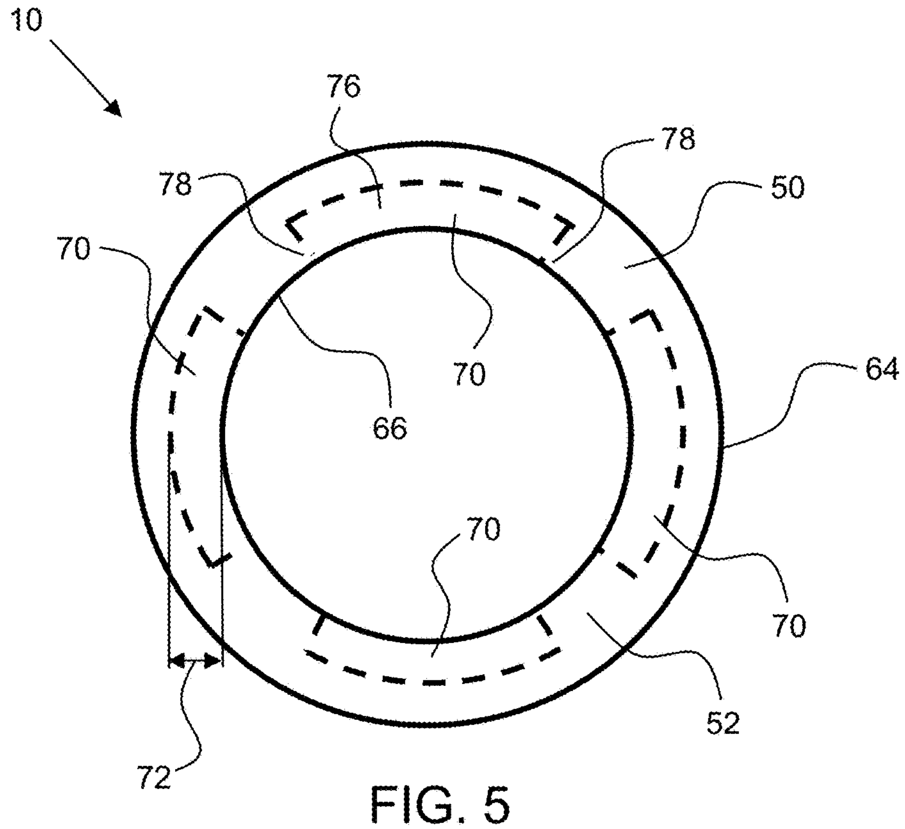
FIG. 5 is a front view of a protective portion of the doorknob of FIG. 1.
Figure 6:
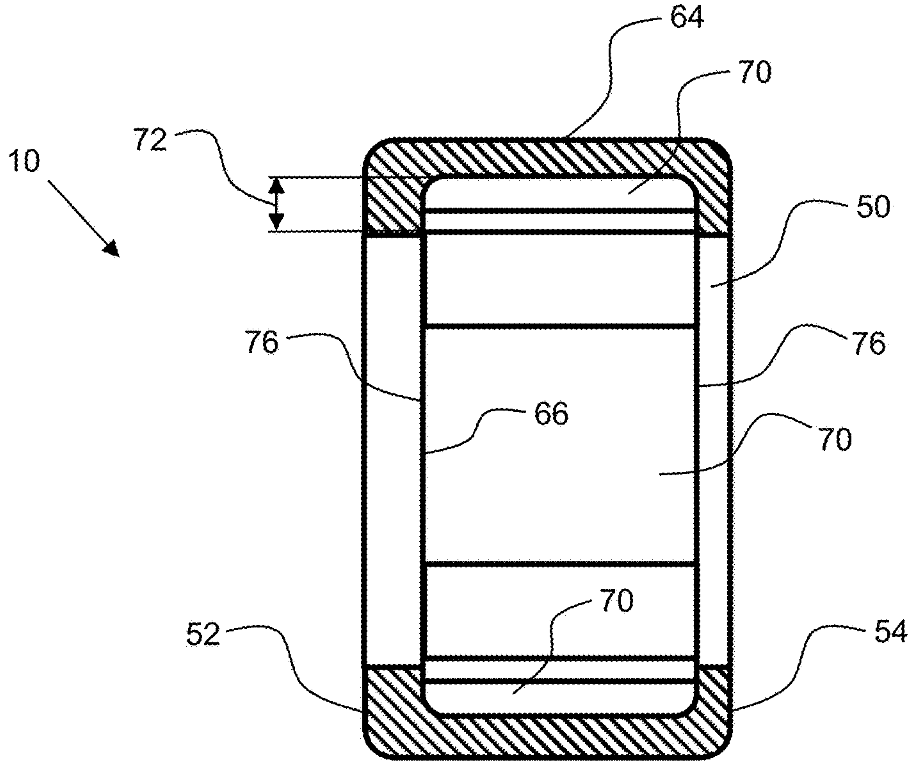
FIG. 6 is a cross-section view of the protective portion of FIG. 5.
Figure 7:
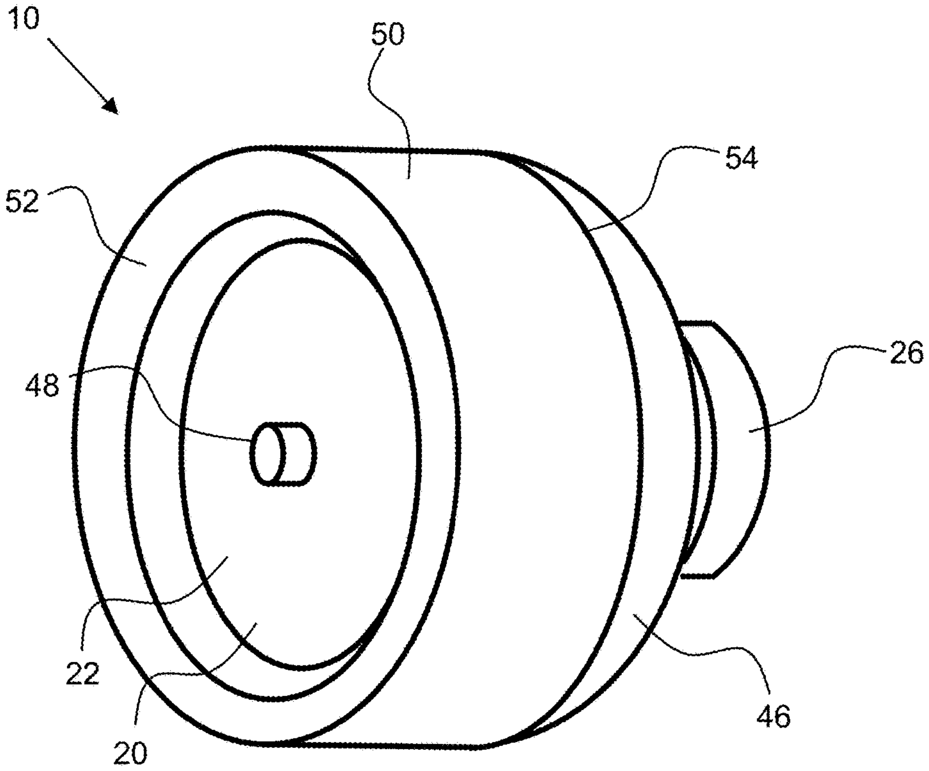
FIG. 7 is a perspective view of a doorknob according to some embodiments of the present invention.
Figure 8:
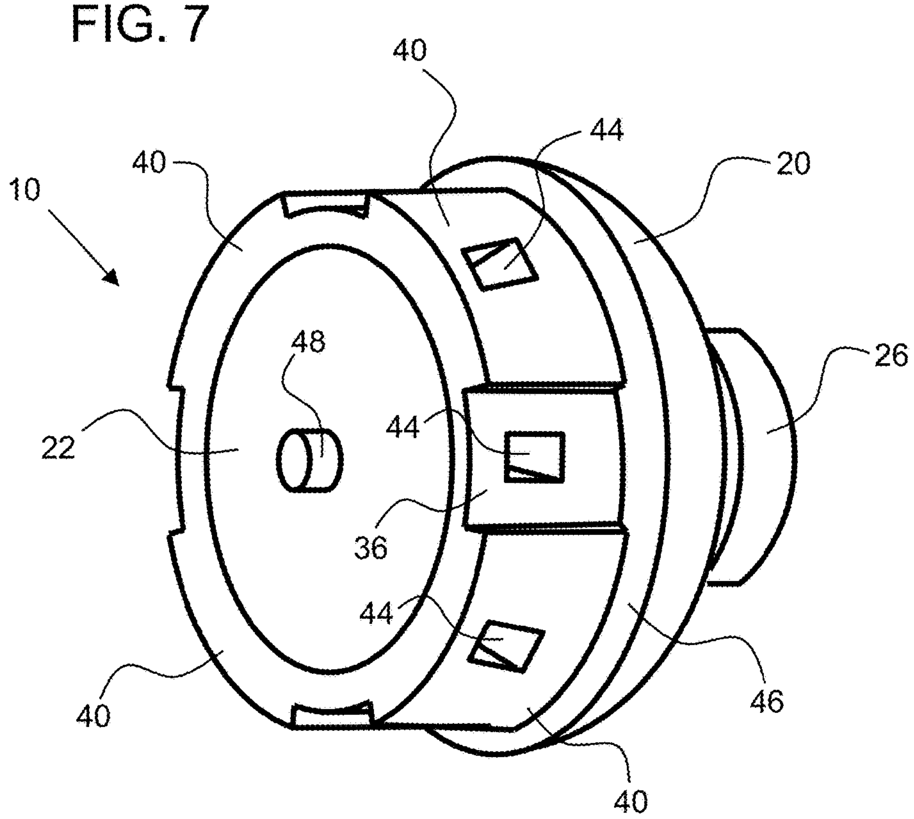
FIG. 8 is a perspective view of the knob portion of the doorknob of FIG. 7.
Figure 9:
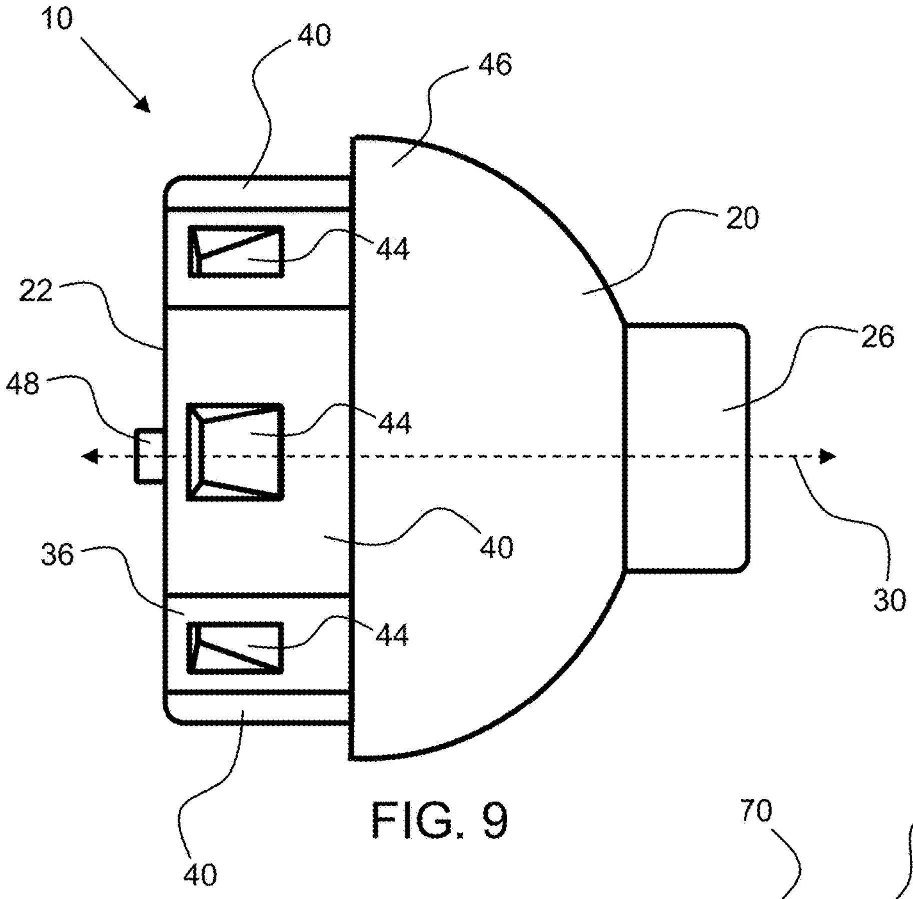
FIG. 9 is a side view of the knob portion of FIG. 8.

The broken lines in FIG. 5 show portions of the protective portion that would not otherwise be visible in FIG. 5.

DETAILED DESCRIPTION OF THE INVENTION

The description provided herein describes example embodiments of the present invention and is not intended to limit the invention to any particular embodiment, feature, component, material, design, shape, size, or any other property. The drawings provided herein show example embodiments of the present invention and are not intended to limit the invention to any particular embodiment, feature, component, material, design, shape, size, or any other property. The drawings may not be drawn to scale. The present invention may comprise any combination of the various embodiments described herein. Other embodiments may be created by combining features, components, and designs described in various embodiments herein.

As used herein, the term "inwards" means "towards the knob center axis" or "towards a center of a cylinder formed by the knob portion or protective portion". The term "outwards" means "away from the knob center axis" or "away from a center of a cylinder formed by the knob portion or protective portion". These terms may be used differently in U.S. Provisional Patent Application No. 63/637,290. However, the direction of the knob extrusions and protective portion indentations shown and described in U.S. Provisional Patent Application No. 63/637,290 is intended to be the same as those shown and described in this application.

In U.S. Provisional Patent Application No. 63/637,290, the term "cover" is used instead of "protective portion". The protective portion shown and described in this application may have the same design, functionality, and purpose as the "cover" shown and described in U.S. Provisional Patent Application No. 63/637,290. This does not limit the protective portion to the exact design, functionality, and purpose of the cover shown and described in U.S. Provisional Patent Application No. 63/637,290, but incorporates said design, functionality, and purpose as possible embodiments herein.

As shown in FIGS. 1-6, a protective portion 50 of a doorknob 10 is configured over a knob portion 20 of the doorknob 10 such that a knob front face 20 is exposed through a protective portion front face 52. The protective portion 50 is configured such that the protective portion front face 52 is parallel with the knob front face 22. A lock actuator 48 is configured on the knob front face 22 and is accessible through the protective portion front face 52.

Figure 4:
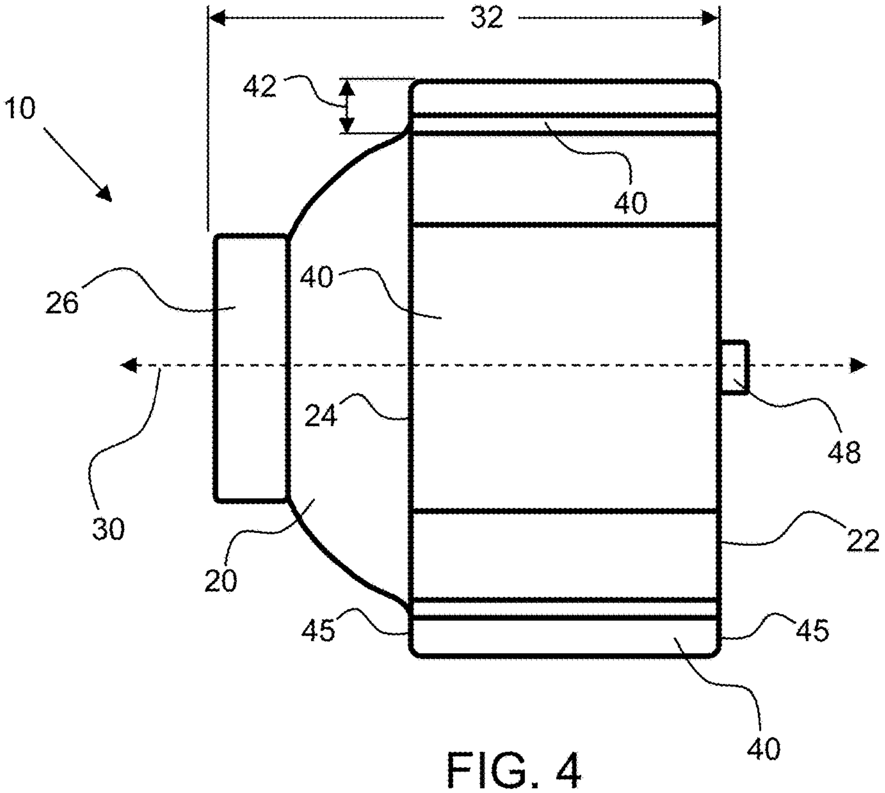
FIG. 4 is a side view of the knob portion of FIG. 2.

A knob rear face 24 is configured opposite the knob front face 24. A knob rear connector 26 extends from the knob rear face 24. The knob rear connector 26 may be used to connect the doorknob 10 to a door or to another doorknob (not shown). A knob center axis 30 extends through the knob portion 20 as shown in FIG. 4. A knob length 32 extends along the knob center axis 30 from the knob front face 22 to the knob rear connector 26. In some embodiments, the knob length may extend from the lock actuator 48 to the knob rear connector 26 since the lock actuator 48 may extend from the knob front face 22. In other embodiments, the knob length may extend only from the knob front face 22 to the knob rear face 24.

Figure 1:
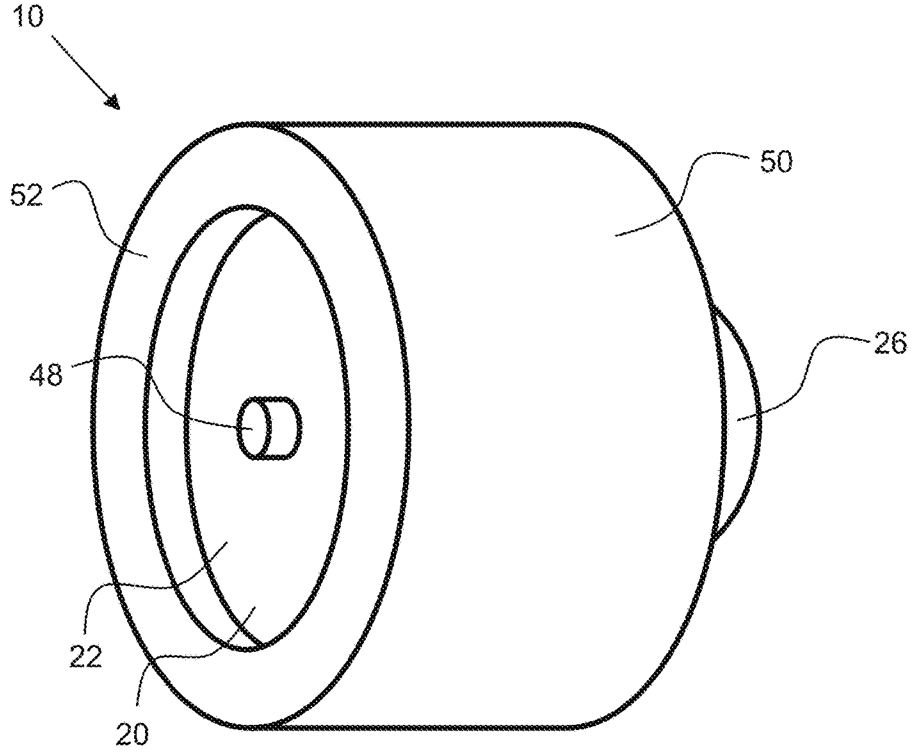
FIG. 1 is a perspective view of a doorknob according to some embodiments of the present invention.
Figure 2:
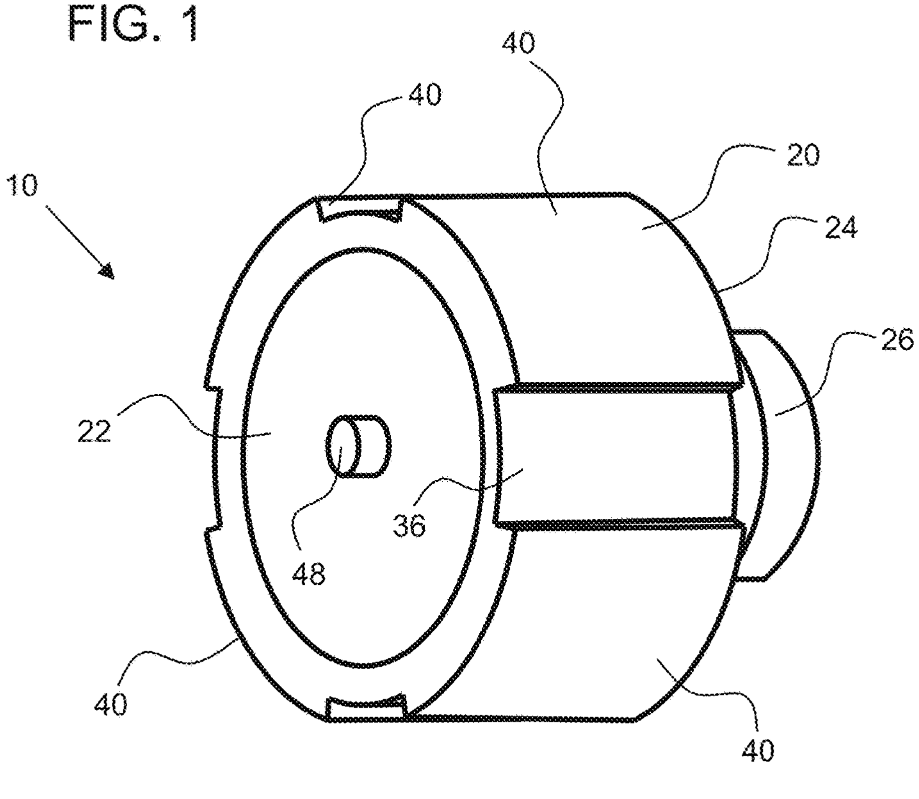
FIG. 2 is a perspective view of the knob portion of the doorknob of FIG. 1.
Figure 3:
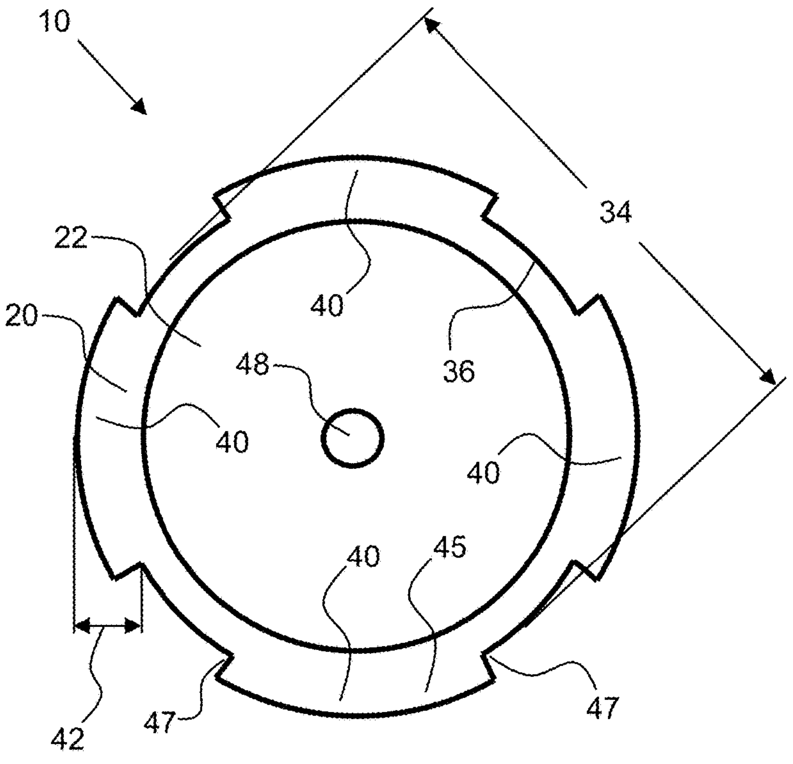
FIG. 3 is a front view of the knob portion of FIG. 2.

A plurality of knob extrusions 40 extend outwards from a knob outer surface 36. The knob extrusions 40 each extend a knob extrusion distance 42 from the knob outer surface 36. Four knob extrusions 40 are shown in FIGS. 2-4. This is not intended to limit the doorknob to having only four knob extrusions. The doorknob may comprise 2 or more knob extrusions, 4 or more knob extrusions, 8 or more knob extrusions, or any number between and including the values provided. The knob extrusions 40 may be arranged in a radially symmetric pattern about the knob center axis 30. Since the knob outer surface 36 is cylindrical as shown in FIGS. 2-4, the knob extrusions 40 may each have a rounded top and 4 linear walls. Two of the linear walls of the knob extrusions may extend away from the knob center axis 30 at a non-parallel angle relative to each other and define extrusion inward cuts 47 described further herein.

As shown in FIG. 3, the knob portion 20 has a knob diameter 34 that is measured across opposing points of the knob outer surface 36, but not at the knob extrusions 40. In some embodiments, the knob diameter may be measured across opposing points on the knob extrusions.

The protective portion 50 has a protective portion inner surface 66 and a protective portion outer surface 64. A plurality of protective portion indentations 70 extend from the protective portion inner surface 66 towards the protective portion outer surface 64. The protective portion indentations 70 each extend a protective portion indentation distance 72. Four protective portion indentations 70 are shown in FIG. 5. This is not intended to limit the protective portion of the doorknob to having only four protective portion indentations. The protective portion may comprise 2 or more protective portion indentations, 4 or more protective portion indentations, 8 or more protective portion indentations, or any number between and including the values provided. In preferred embodiments, the number of protective portion indentations 70 is equal to the number of knob extrusions 40. The protective portion indentations 70 may be arranged in a radially symmetric pattern about the protective portion inner surface 66. When the protective portion 50 is configured over the knob portion 20, the protective portion indentations 70 may be arranged in a radially symmetric pattern about the knob center axis 70. The shapes of the protective portion indentations 70 preferably match the shapes of the knob extrusions 40 so that the knob extrusions 40 fit within the protective portion indentations 70.

The protective portion 50 is configured over the knob portion 20 such that each of the plurality of knob extrusions 40 are configured within one of the plurality of protective portion indentations 70. Simply configuring the protective portion 50 over the knob portion 20 may secure the protective portion 50 radially to the knob portion 20. Configuring each of the plurality of protective portion extrusions 40 into one of the plurality of protective portion indentations 70 may secure the protective portion 50 tangentially to the knob portion 20. When the protective portion 50 is configured over the knob portion 20, the knob rear face 24 may contact the protective portion inner surface 66 at a protective portion rear face 54, and the knob front face 22 may contact the protective portion inner surface 66 at the protective portion front face 52. These contact points may secure the protective portion 50 axially to the knob portion 20.

Each knob portion 40 has two axial sides 45 configured opposite one another. Each axial side 45 is configured parallel to the knob front face 22 and the knob rear face 24. Each knob extrusion 40 has two extrusion inward cuts 47 that extend inwards towards one another and towards the knob center axis 30. Each protective portion indentation 70 has two axial sides 76 configured opposite one another. Each protective portion indentation 70 has two indentation outward cuts 78 that extend outwards away from one another and towards the protective portion outer surface 64. When the protective portion 50 is configured over the knob portion 20, each indentation outward cut 78 may be configured within a corresponding extrusion inward cut 46 to further secure the protective portion 50 tangentially to the knob portion 20. When the protective portion 50 is configured over the knob portion 20, both the axial sides 45 of each of the plurality of knob extrusions 40 may be configured between the axial sides 76 of a corresponding protective portion indentation 70 into which the knob extrusion 40 is configured. This arrangement may secure the protective portion 50 axially to the knob portion 20.

As shown in FIGS. 7-10, the protective portion 50 of the doorknob 10 is configured over the knob portion 20 such that the knob front face 20 is exposed through the protective portion front face 52. The protective portion 50 is configured such that the protective portion front face 52 is parallel with the knob front face 22. The lock actuator 48 is accessible through the protective portion front face 52. Instead of being configured over the knob rear face, the protective portion rear face 54 contacts a knob rear stop 46 that extends outwards from the protective portion outer surface 36. This contact prevents the protective portion 50 from moving axially along the knob portion 20 towards the knob rear connector 26. However, this contact does not prevent the protective portion 50 from moving axially along the knob portion 20 away from the knob rear connector 26.

In order to prevent the protective portion 50 from moving axially along the knob portion 20 away from the protective portion rear connector 26 in the embodiments shown in FIGS. 7-10, the knob portion 20 comprises a plurality of knob indentations 44 configured on the knob extrusions 40 and the knob outer surface 36 and extending inwards towards the knob center axis 30. In some embodiments, the knob indentations 44 are only configured on the knob outer surface 36. In other embodiments, the knob indentations 44 are only configured on the knob extrusions 40. The protective portion 50 comprises a plurality of protective portion extrusions 74 that correspond to the plurality of knob indentations 44. The protective portion extrusions 74 are configured on the protective portion inner surface 66 and in the protective portion indentations 70. The protective portion extrusions 74 extend inwards away from the protective portion outer surface 64. In some embodiments, the protective portion extrusions 74 are only configured on the protective portion inner surface 66. In other embodiments, the protective portion extrusions 74 are only configured in the protective portion indentations 70.

Each of the plurality of protective portion extrusions 74 may be configured in a corresponding one of the plurality of knob indentations 44 to prevent the protective portion 50 from moving axially along the knob portion 20 away from the knob rear connector 26. This may also secure the protective portion 50 tangentially to the knob portion 20. However, since the knob extrusions 40 and protective portion indentations 70 may extend a greater distance from their respective surfaces than the knob indentations 44 and protective portion extrusions 74, the mating between the knob extrusions 40 and protective portion indentations 70 may better secure the protective portion 50 tangentially to the knob portion 20 than the mating between the knob indentations 44 and the protective portion extrusions 74.

Figure 10:
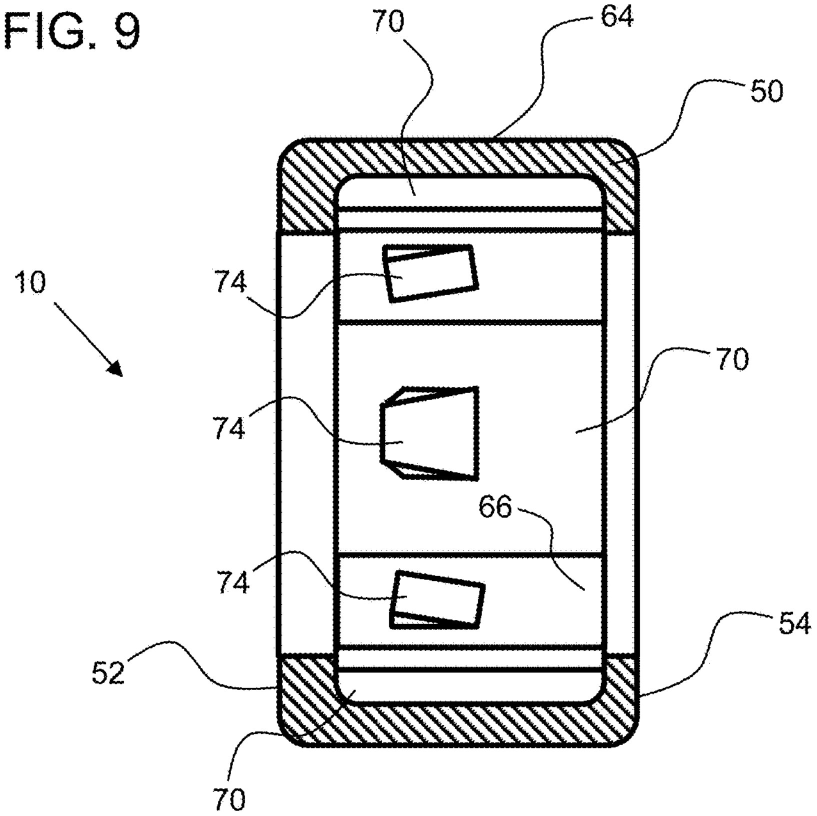
FIG. 10 is a cross-section view of a protective portion of the doorknob of FIG. 7.

Each of the plurality of protective portion extrusions 74 may be shaped as an inclined plane as shown in FIG. 10. The highest point of the inclined plane may face the protective portion front face 52. Likewise, each of the plurality of knob indentations 44 may be shaped as an inclined plan depressed into the knob outer surface 36 and/or plurality of knob extrusions 40. The lowest point of the depressed inclined plan may face the knob front face 22 so that the shapes of the knob indentations 44 match those of the protective portion extrusions 74.

Figure 11:
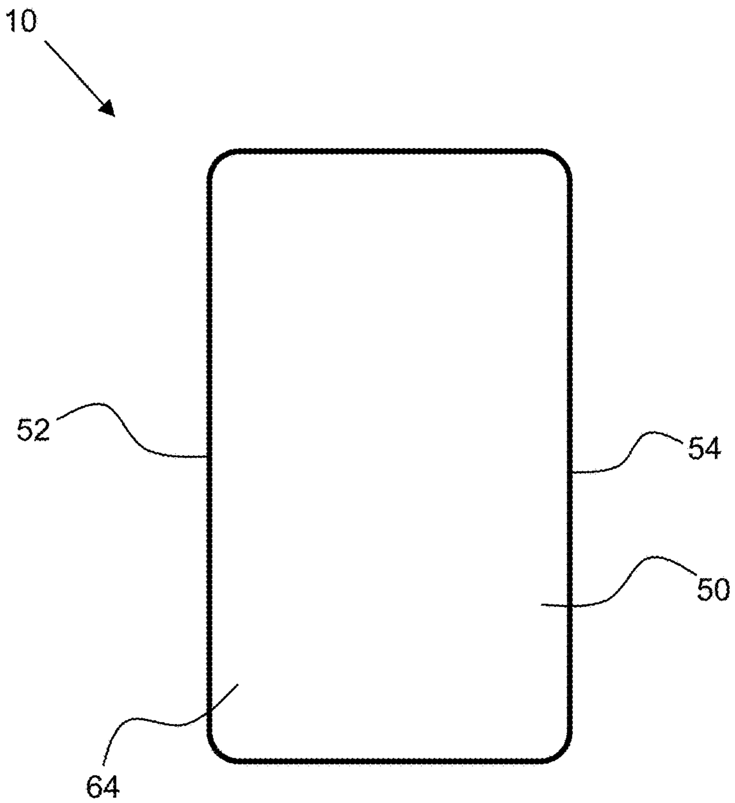
FIG. 11 is a side view of a protective portion with a smooth outer surface.
Figure 12:
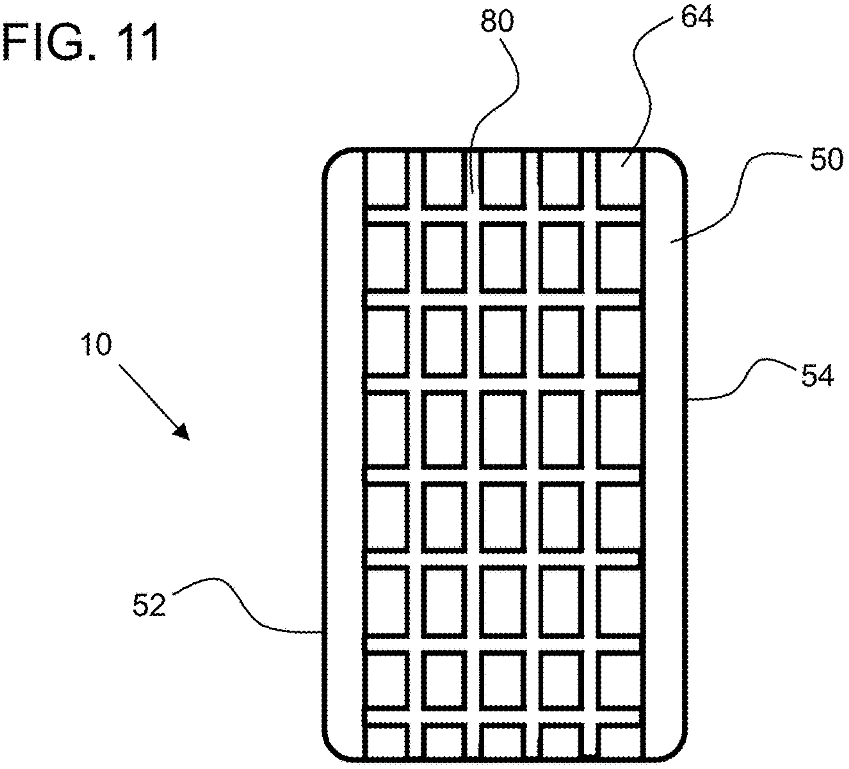
FIG. 12 is a side view of a protective portion with outer surface indentations.

As shown in FIG. 11, a protective portion 50 has a smooth protective portion outer surface 64. The protective portion outer surface 64 is free from extrusions or indentations. As shown in FIG. 12, outer surface indentations 80 are configured on the protective portion outer surface 64. The outer surface indentations 80 extend from the protective portion outer surface 64 towards the protective portion inner surface. The outer surface indentations 80 may allow for a user to easily grip the protective portion 50 when turning the doorknob 10. As shown in FIG. 12, the outer surface indentations 80 are arranged in a checkered pattern across the protective portion outer surface 64. This is not intended to limit the pattern of the outer surface indentations 80 in all embodiments of the invention. The outer surface indentations may be any shape and size and may be arranged in any pattern across the protective portion outer surface.

The invention claimed is:

1. A doorknob comprising:

a knob portion comprising:

a knob outer surface;

a knob front face;

a knob rear connector;

a knob length extending from the knob rear connector to the knob front face;

a knob center axis;

a plurality of knob extrusions extending outwards from the knob outer surface, wherein the plurality of knob extrusions also extend axially along the knob outer surface;

a protective portion comprising:

a protective portion front face;

a protective portion inner surface;

a protective portion outer surface; and a plurality of protective portion indentations extending from the protective portion inner surface towards the protective portion outer surface, wherein the protective portion is configured over the knob portion whereby each of the plurality of knob extrusions is configured within a corresponding one of the plurality of protective portion indentations, wherein the protective portion is secured tangentially to the knob portion by the mating between the plurality of knob extrusions and the plurality of protective portion indentations, wherein the protective portion front face extends past the knob front face, wherein at least a portion of the knob front face is accessible through the protective portion front face, wherein the protective portion front face serves as a barrier between the knob portion and another object.

2. The doorknob of claim 1, further comprising a lock actuator configured on the knob front face, wherein the lock actuator is accessible through the protective portion front face.

3. The doorknob of claim 1, wherein the plurality of knob extrusions extend the entire knob length axially along the knob outer surface.

4. The doorknob of claim 1, wherein the plurality of knob extrusions do not extend the entire knob length axially along the knob outer surface, wherein the protective portion is secured axially to the knob portion by the connection between the plurality of knob extrusions and the plurality of protective portion indentations.

5. The doorknob of claim 1, wherein each of the plurality of knob extrusions comprise:

two axial sides; and an extrusion inward cut configured at each axial side, wherein each of the plurality of protective portion indentations comprise:

two axial sides; and an indentation outward cut, wherein when each of the plurality of knob extrusions is configured within a corresponding one of the plurality of protective portion indentations, each indentation outward cut is configured within an extrusion inward cut to further secure the protective portion tangentially to the knob portion.

6. The doorknob of claim 1, wherein the protective portion is permanently connected to the knob portion.

7. The doorknob of claim 1, wherein the protective portion is removably connected to the knob portion.

8. The doorknob of claim 1, wherein the knob portion has a knob portion diameter, wherein each of the plurality of knob extrusions extends a knob extrusion distance from the knob outer surface, wherein the knob extrusion distance is twice the knob diameter or less.

9. The doorknob of claim 8, wherein the knob extrusion distance is one times the knob diameter or less.

10. The doorknob of claim 8, wherein the knob extrusion distance is half the knob diameter or less.

11. The doorknob of claim 8, wherein each of the plurality of protective portion indentations extend a protective portion indentation distance from the protective portion inner surface towards the protective portion outer surface, wherein the protective portion indentation distance is substantially the same as the knob extrusion distance.

12. The doorknob of claim 1, wherein the plurality of knob extrusions are 2 or more knob extrusions, and wherein the plurality of protective portion indentations are 2 or more protective portion indentations.

13. The doorknob of claim 1, wherein the plurality of knob extrusions are 4 or more knob extrusions, and wherein the plurality of protective portion indentations are 4 or more protective portion indentations.

14. The doorknob of claim 1, wherein the knob portion further comprises a knob rear stop configured between the knob front face and the knob rear connector and extending outwards from the knob outer surface, wherein the plurality of knob extrusions do not extend axially along the knob rear stop, wherein the protective portion is not configured over the knob rear stop.

15. The doorknob of claim 14, wherein plurality of knob extrusions extend from the front face to the knob rear stop.

16. The doorknob of claim 1, wherein the knob portion further comprises a knob rear face, wherein the protective portion further comprises a protective portion rear face, wherein the knob front face and the knob rear face are both configured between the protective portion front face and the protective portion rear face to secure the protective portion axially to the knob portion.

* * * * *